United States Patent [19]

Sukhanov et al.

[11] 4,096,404
[45] Jun. 20, 1978

[54] HOISTING MECHANISM

[76] Inventors: Donat Konstantinovich Sukhanov, ulitsa Vavilova, 56, korpus 1, kv. 75; Sergei Ivanovich Blinov, 1 Monetchikovy pereulok, 5, kv. 1; Leonid Leonidovich Bogoljubov, ulitsa Rusakovskaya, 6, kv. 59; Sergei Andreevich Kascheev, ulitsa Chusovskaya, 11, korpus 8, kv. 2; Evgenia Nikolaevna Popova, Volokolamskoe shosse, 1, kv. 177, all of Moscow, U.S.S.R.

[21] Appl. No.: 765,287

[22] Filed: Feb. 3, 1977

[51] Int. Cl.² .............................................. H02K 7/10
[52] U.S. Cl. ............................... 310/67 R; 310/75 R; 310/83; 310/77
[58] Field of Search .................... 310/67, 75 R, 75 D, 310/83, 76, 77, 78, 51, 91, 89

[56] References Cited

U.S. PATENT DOCUMENTS

| | | | |
|---|---|---|---|
| 2,540,099 | 2/1951 | Christian | 310/67 X |
| 2,548,399 | 4/1951 | Schrock | 310/67 |
| 2,826,939 | 3/1958 | Dever | 310/67 |
| 2,997,608 | 8/1961 | Musser | 310/67 |
| 3,056,054 | 9/1962 | Christian | 310/67 X |
| 3,447,005 | 5/1969 | Yokayama | 310/83 X |
| 3,784,852 | 1/1974 | Noly | 310/77 X |
| 3,854,063 | 12/1974 | Bergman | 310/75 D |
| 3,886,255 | 5/1975 | Noly | 310/77 X |

*Primary Examiner*—Donovan F. Duggan
*Attorney, Agent, or Firm*—Fleit & Jacobson

[57] ABSTRACT

The present invention relates to hoisting mechanisms and can be utilized to utmost effectiveness in electric hoists. The hoisting mechanism is provided with a rope drum enclosed within a casing and a driving unit of which the motor is accommodated within the rope drum and operatively connected with a reducing gear and a brake. The housing of the motor on the brake side is arranged in supports permitting angular displacement of the output shaft of the driving unit relative to the axis of symmetry of the mechanism and adapted to transmit to the reaction torque to the casing. The drum has one end thereof mounted in a support, the other end of the drum having a flange pivotally supported by the output shaft of the reducing gear of which the input shaft is axially aligned with the output shaft. The disclosed construction enhances reliability and durability of the hoist, facilitates its assembling, operating and maintenance and improves the ergonomic characteristics of the mechanism.

5 Claims, 4 Drawing Figures

HOISTING MECHANISM

The present invention relates to load-lifting mechanisms, and, more particularly, it relates to hoisting mechanisms.

The invention can be utilized to utmost effectiveness in electric hoists; however, it can also be effectively incorporated in the driving gears of hoists with fluid, e.g. air and hydraulic motors and other types of motors.

An electric hoist is nowadays probably one of the most frequently employed means of mechanisation of load-handling jobs. The main requirements put before such machines are high efficiency, reliable performance, ease of maintenance and repairs, small size and weight and low cost.

Electric hoists find applications practically in all fields of industry and agriculture, in means of transportation and public service facilities, in short, wherever piece loads are to be lifted and handled. A hoist of the commonly used types requires no special operator, being operated, as it is, by workers engaged in the main production or trade.

There are numerous types of the design of an electric hoist with a rope; however, whichever the type, it invariably comprises a driving unit or assembly including a motor, a reducing gear and a brake, a rope-winding drum and a casing, i.e., the framework of the hoist. More often than not hoists have an axially aligned structure, with all the abovesaid major assemblies or units being aligned along a single geometric axis which, to a greater or smaller degree, is the axis of symmetry of each assembly or unit. In a structure of this type in most cases the interior of the winding drum is used to accommodate therein a portion of the driving unit for space-saving reasons.

Hoists of an axially aligned structure with the motor accommodated in the interior of the winding drum are marketed, for example, by KONE, Finland, UNELEC, France, RONCHI, Italy, and others.

In these structures of rope hoists the hoisting mechanism includes a rope-winding drum enclosed within a casing and rotatable in operation by a driving unit axially aligned therewith, wherein the motor is structurally associated with the brake. The motor is rigidly secured to the casing at one of its sides by means of a flange provided on the motor housing. At the opposite side, the casing has the reducing gear also rigidly secured thereto. The connectable ends of the respective shafts of the motor and of the reducing gear are, in fact, cantilever members. However, on account of production flaws and, to a greater degree, on account of the action of the loads in operation, the shafts become offset from their axially aligned position. To compensate for this misalignment and to provide for transmission of the driving torque from the motor to the reducing gear, it becomes necessary to provide the hoisting mechanisms with coupling means of a rather complicated design.

An annular gap left between the housing of the motor and the internal surface of the winding drum offers a passage for a stream of air cooling the motor in operation.

It is commonly known that electric hoists are operated to lift loads of a mass which is several times that of the hoist itself, which is reflected in significant resilient strain of its major assemblies, mainly, of the casing, drum and reducing gear. With the motor and the reducing gear rigidly secured to the casing, the coupling means of the complicated design, incorporated to transmit the driving torque from the motor to the reducing gear, is subjected to considerable unspecified loads and strain which affect its service life.

A desire to have accurate alignment of the respective shafts of the motor and of the reducing gear puts forward a requirement of highly accurate machining of the engagement surfaces of the casing, of the motor and of the reducing gear.

To minimize deformation caused by loads in operation, there is a tendency of stepping up the rigidity of the assemblies of the mechanism, subject to deformation, which is reflected in an increased amount of metal in the structure and the latter's increased weight.

With the motor rigidly secured to the casing, the noise generated by the operating motor is transmitted directly to this casing which in most cases is of a thin-walled three-dimensional structure displaying resonating properties, whereby the noise level of the operating machine can be relatively high.

It is an object of the present invention to eliminate the above-mentioned disadvantages.

The main object of the present invention is to provide a hoisting mechanism wherein the structure of the driving unit and its connection with the casing and with the drum should provide for enhanced reliability and durability, for facilitated assembling, operating and maintenance of the hoist and for improving the ergonomic characteristics of the hoisting mechanism.

This object is accomplished in a hoisting mechanism comprising a rope-winding drum enclosed within a casing and rotatable for a load-hoisting operation by a driving unit axially aligned therewith, at least the motor of this driving unit being accommodated within this drum and operatively connected with a reducing gear and a brake, in which mechanism, in accordance with the invention, the housing of the motor on the brake side is arranged in supports mounted on the casing, permitting angular displacement of the output shaft of the driving unit relative to the axis of symmetry of the mechanism and adapted to transmit to the reaction torque to the casing, the drum having one its end mounted in a support accommodated intermediate the external surface of the drum and the casing, the opposite end of the drum having a flange pivotally supported by the output shaft of the reducing gear of which the input shaft is axially aligned with the output shaft. The reliability and durability of the hoisting mechanism of the invention have been enhanced, owing to the major assemblies of the hoist, viz. the casing, the drum, the motor and the reducer having become independent from one another as far as their relative angular displacements are concerned, the points of their connection being predominantly engaged in the transmission of torques, which virtually precludes application of unspecifiable loads to the components of the mechanism, these loads, as a rule, being not included into durability and reliability evaluations when the hoist is being designed.

In accordance with a further feature of the present invention, the hoisting mechanism has its reducing gear rigidly secured to the casing of the hoist, the input shaft of the reducing gear being pivotally connected to the shaft of the motor, acting as the output shaft of the driving unit.

The above structural feature facilitates assembling of the hoist and provides for more leniency in the requirements concerning the accuracy of the manufacture of the interengaging members thereof; furthermore, the overall structure is simplified, owing to a complicated coupling having been replaced with a simpler and more reliable one.

According to another feature of the present invention in the hoisting mechanism the motor housing is adapted to accommodate the reducing gear of the driving unit, the motor shaft being made integral with the input shaft of the reducer of which the output shaft acts as the output shaft of the driving unit and has the said flange of the drum directly supported thereby.

Owing to the incorporation of the common housing for the motor and the reducing gear, which particularly fits hoists of relatively small capacities, inspection and maintenance of the driving unit are facilitated, since they can be performed independently of other assemblies of the hoist. Furthermore, the aforesaid feature enables to reduce the mass of the driving unit and facilitates its assembling, and also improves the ergonomic characteristics of the mechanism.

It is expedient that the supports of the housing of the motor should be made in the form of a sleeve-and-pin coupling of which the stationary member is the casing of the hoist and the movable one is made up by lugs on the motor housing, the pins of the coupling being received in said lugs, with each pin having one its end rigidly attached to the housing and the opposite end of each pin having a shoulder outside the respective lug, to limit the axial displacement of the driving unit.

With the supports being made in the form of a pin-and-sleeve coupling with the pins arranged at the greater diameter, the load applied to each pin is substantially reduced, and it becomes possible to have, with relatively great assembling gaps, provisions for angular displacement of the output shaft of the driving unit, which displacement, although small, is nevertheless sufficient for reliable performance. Moreover, this embodiment of the invention can be noted for its simplicaty.

The reduction of the load applied to the connecting pins (and any connecting member, in that sense) is one of the reasons why for hoists of relatively great capacities it is expedient to employ a layout wherein only the motor per se is accommodated within the interior of the drum, since in this case it is only the reaction torque of the motor, not amplified by the reducing gear, which is transmitted to the casing of the hoist.

In accordance with yet another feature of the present invention, an elastic member is interposed between each pin and the lug, i.e., received in the clearance between the pin and the lug, to eliminate direct contact between the housing of the motor and the casing of the hoist.

For the present invention to be better understood, given hereinbelow is a description of embodiments of the invention, with reference being had to the accompanying drawings, wherein.

Figure 1:
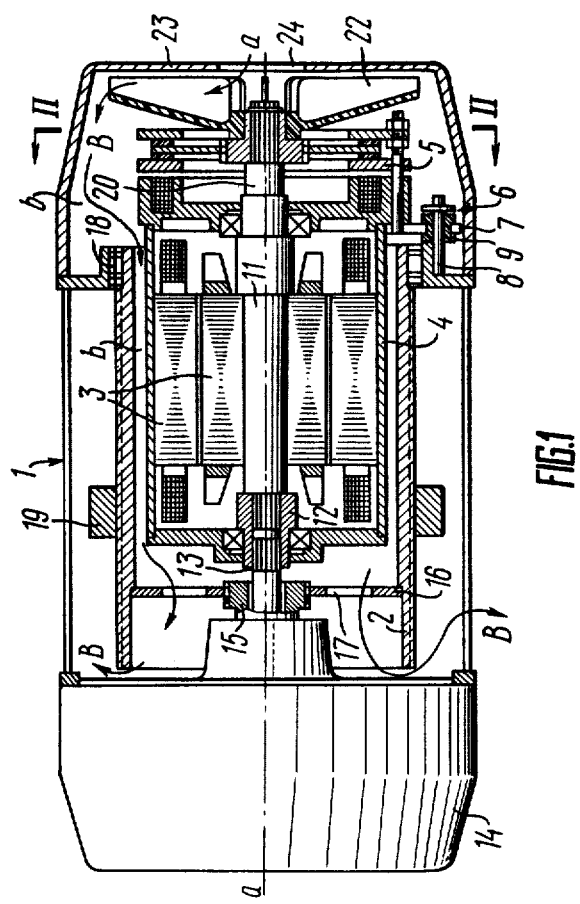
FIG. 1 is a longitudinal sectional view of one embodiment of the invention in a hoisting mechanism.

In the drawings, the hoisting mechanism comprises a casing 1 and a rope-winding drum 2 accommodated in the casing 2 coaxially therewith. The drum 2 accommodates therein an electric motor 3 having a common housing 4 with a brake 5.

Figure 2:
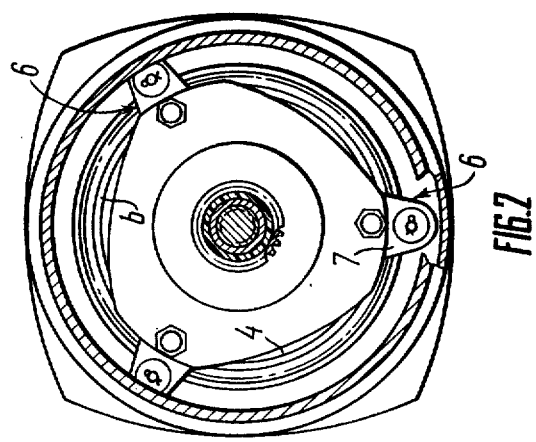
FIG. 2 is a sectional view taken on line II—II of FIG. 1.
Figure 4:
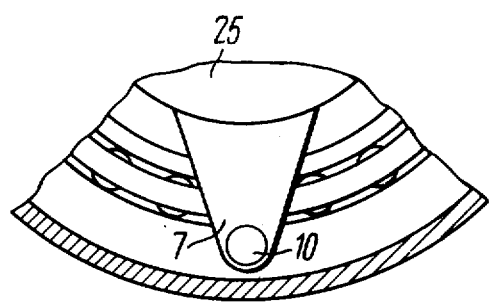
FIG. 4 is a view along arrow line A in FIG. 3.

The housing 4 of the motor 3 is the common housing of the driving unit, connected with the casing 1 by means of supports 6. The supports 6 are made in the form of a pin-and-sleeve coupling permitting angular displacement of the output shaft of the driving unit relative to the axis "a-a" of symmetry of the hoisting mechanism and capable of transmitting the reaction torque to the casing 1. The coupling is made up by stationary and movable members. The movable member is made up by lugs (FIGS. 2 and 4) made integral with the housing 4, while the stationary member of the coupling is represented by the casing 1 (FIG. 1). This casing supports the ends of pins 8 received in the lugs 7. The clearance between the pins 8 and the lugs 7 have positioned therein resilient members 9 made in the form of bushes preventing direct contact between the housing 4 and the casing 1. The ends of the pins 8, opposite to those attached to the casing 1, have made thereon annular shoulders 10 limiting axial displacement of the housing 4 of the motor 3, and, consequently, of the driving unit, as a whole.

The shaft 11 of the motor 3 has one its end 12 pivotally connected with the input shaft 13 of a reducing gear 14 rigidly secured to the casing 1. The shaft 11 of the motor 3 in the presently described embodiment is the output shaft of the driving unit.

The input shaft 13 of the reducing gear 14 is axially aligned with its output shaft 15 pivotally supporting a flange 16 with holes 17, made integral with one end of the drum 2.

The other end of the drum 2 is mounted in a support 18 arranged between the external surface of the drum 2 and the casing 1. Any suitable known type of an antifriction bearing can be used as the support 18, e.g. a roller bearing.

The drum 2 has mounted thereon a rope guide 19 assisting in guiding the rope into the grooves of the drum when a load is being lifted.

The end 20 of the shaft 11 of the motor 3 is associated with the brake 5 actuated by a solenoid 21 and carries the impeller 22 of a fan generating a stream of air cooling the motor 3 in operation.

The brake 5 and the impeller 22 are enclosed within a cover 23 having made therethrough an intake opening 24 through which air is drawn in operation.

Figure 3:
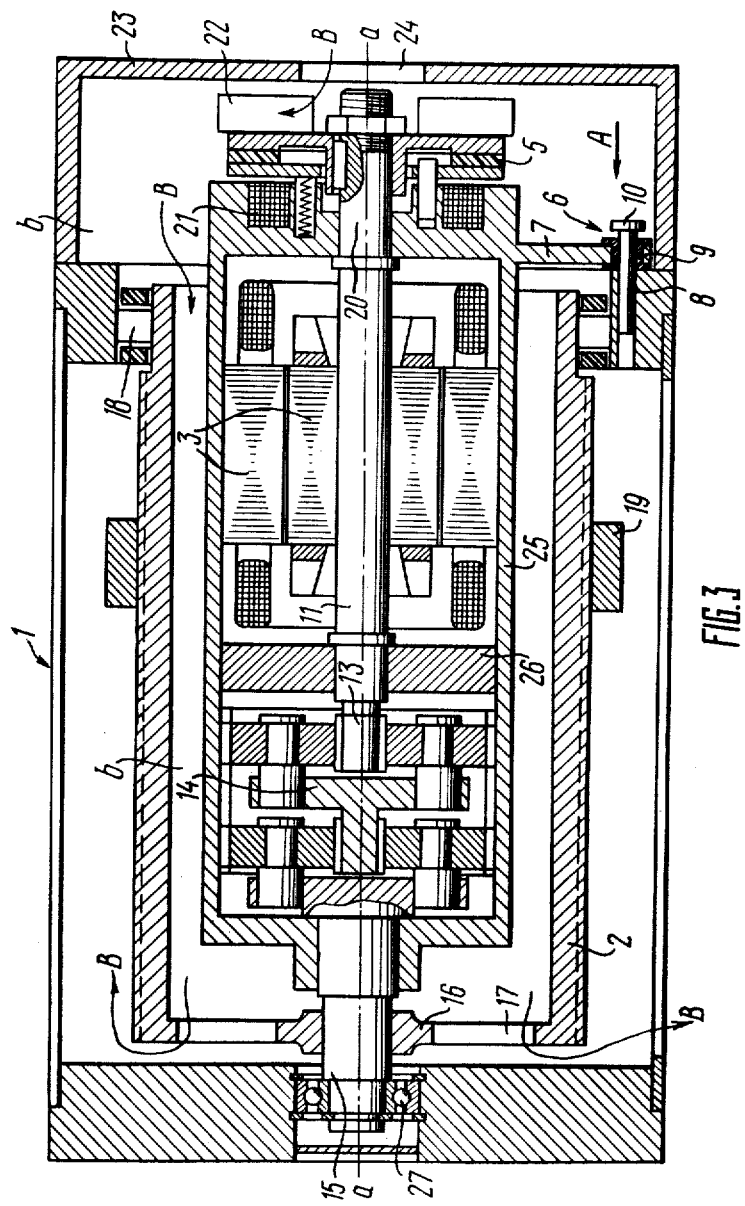
FIG. 3 is a longitudinal sectional view of another embodiment of the present invention.

For hoists of relatively small capacities, e.g. those within 0.5 tons, it is expedient to employ the embodiment of the hoisting mechanism, illustrated in FIG. 3.

In this embodiment the housing 25 of the motor 3 is adapted to accommodate therein also the reducing gear 14. The housing 25 has a partition 26 sealingly dividing it into two spaces: one accommodating the motor 3 and the other one accommodating the reducing gear 14. An opening being provided through the partition 26 for passage of the shaft 11 of the motor 3 therethrough. The shaft 11 of the motor 3 of the presently described embodiment is integral with the input shaft 13 of the reducing gear 14. In this embodiment the housing 25 is the housing of the entire driving unit, and the output shaft 15 of the reducing gear 14 is the output shaft of this driving unit, directly supporting the flange 16 of the drum 2.

The reducing gear 14, the motor 3 and the brake 5 are coaxially aligned within the housing 25, while one side of the housing 25 is mounted in the casing 1 by means of the supports 6. At the other side of the housing 25, the output shaft 15 of the reducing gear 14, extending there-from, is mounted in an antifriction bearing 27 mounted, in its turn, in the casing 1.

The disclosed hoisting mechanism operates, as follows.

With the motor 3 energized, the brake 5 is released, and the torque amplified by the reducing gear 14 is transmitted to the drum 2, whereby the latter is rotated to wind the rope thereupon and thus to lift a load. With the motor 3 operating, the impeller 22 of the fan draws in air through the opening 24 in the cover 23 and directs it into the gap "b" defined by the internal surfaces of the cover 23, of the drum 2 and by the external surfaces of the housing 4 or 25 and of the components of the brake assembly 5. Having flown through this gap "b", the air exits via the holes 17. In the appended drawings the direction of the air stream is indicated with arrows "B".

The reaction torque produced by the driving action of the operating motor 3 is transmitted via the lugs 7 and the resilient members 9 to the casing 1 of the hoist.

The provision of clearances in the connections precludes rigid connection of the casing 1 with the motor 3. The articulated connection of the output shaft 15 of the reducing gear 14 with the flange 16 of the drum 2, jointly with (in one of the embodiments) articulated connection between the shaft 11 of the motor 3 and the input shaft 13 of the reducing gear 14 eliminate the adverse effects of resilient deformation of the casing 1 and of the drum 2, simplifies the connection of the shaft 11 of the motor 3 with the input shaft 13 of the reducing gear 14 (a compensating coupling is no loger required, the simple pivotal connection being sufficient).

The herein disclosed hoisting mechanism offers easy replacement of the motor jointly with the brake assembly. The accuracy requirements put before the components of the mechanism are less severe, and the overall reliability and efficiency of the operation of the hoist are enhanced.

What is claimed is:

1. A hoisting mechanism comprising: a casing; a rope-winding drum enclosed within said casing; a driving unit mounted coaxially with said drum and adapted to effect rotation of said drum to lift a load; a motor of said driving unit, accommodated within said drum and having a housing; a reducing gear of said driving unit, operatively connected with said motor and having an input shaft and an output shaft; the shafts of said reducing gear being axially aligned; a brake of said driving unit, operatively connected with said motor; the housing of said motor at the side of said brake being accommodated in supports mounted on said casing and permitting angular displacement of the output shaft of said driving unit relative to the axis of symmetry of the mechanism and adapted to transmit the reaction torque to said casing; one end of said drum being mounted in another support arranged between the external surface of said drum and said casing; a flange made on the other end of said drum and pivotally supported by the output shaft of said reducing gear.

2. A hoisting mechanism as claimed in claim 1, wherein said reducing gear is rigidly secured to said casing and has the input shaft thereof pivotally connected with the shaft of said motor, acting as the output shaft of the driving unit.

3. A hoisting mechanism as claimed in claim 1, wherein the housing of said motor is adapted to accommodate therein said reducing gear of said driving unit, the shaft of said motor being integral with the shaft of said reducing gear, the output shaft of the latter acting as the output shaft of the driving unit and having said flange of said drum directly pivotally supported thereby.

4. A mechanism as claimed in claim 1, wherein the supports of said housing are in the form of a pin-and-sleeve coupling of which the stationary member is said casing and the movable member is made up by lugs provided on said housing, the pins of the coupling being received in the lugs, one end of each pin being rigidly attached to said casing, and the other end of each pin being provided with a shoulder outside the respective lug, to limit axial displacement of said housing.

5. A mechanism as claimed in claim 4, wherein a clearance is left intermediate each pin and its respective lug, accommodating a resilient member preventing direct contact between said housing and said casing.

* * * * *